July 19, 1932.   K. G. NOWAK   1,868,362
EYE SHADE, GOGGLES, AND THE LIKE
Filed Sept. 1, 1931
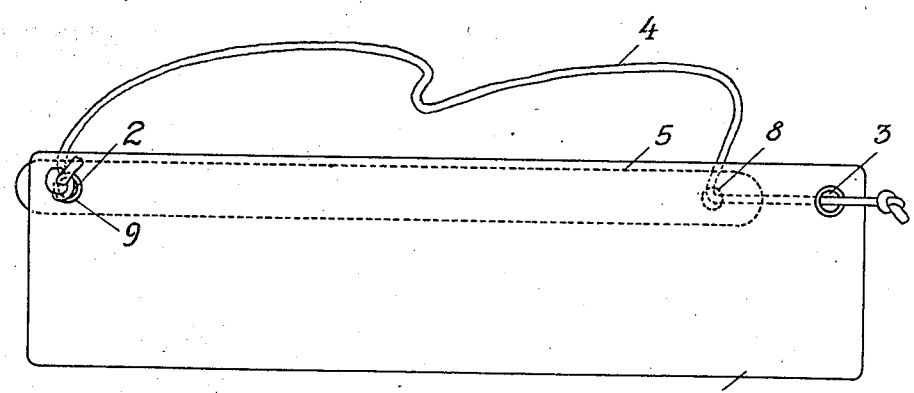
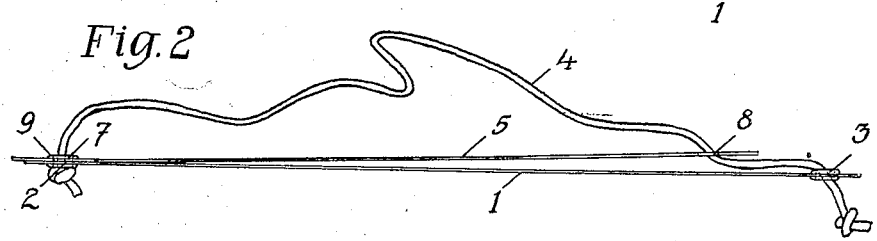
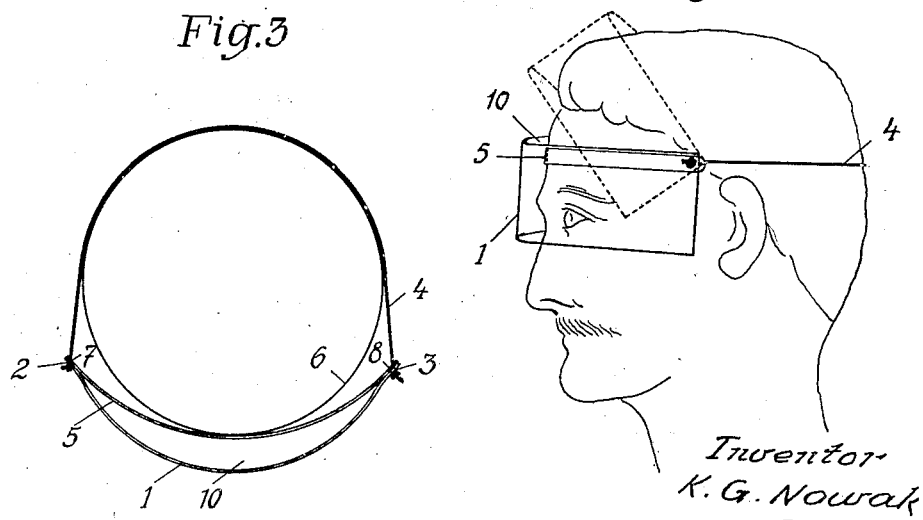
Inventor
K. G. Nowak
By [signature]
Atty.

Patented July 19, 1932

1,868,362

UNITED STATES PATENT OFFICE

KARL GEORG NOWAK, OF VIENNA, AUSTRIA

EYESHADE, GOGGLES, AND THE LIKE

Application filed September 1, 1931, Serial No. 560,614, and in Austria October 27, 1930.

This invention relates to eye shades, goggles and the like in which two strips are arranged one behind the other, the rearward strip (intended to bear against the forehead) being of flexible, springy material and the front strip forming an opaque or transparent shade capable of being swung out of the field of vision when necessary.

The invention consists in providing holes in the two ends of each strip, those in the rear strip being closer together than those in the front strip, and the cord which is to be passed round the wearer's head being drawn through said holes and secured, at the ends, to the front strip.

Known eye shades, goggles and the like exhibit the great defect that, owing to inadequate ventilation, their surfaces become dimmed by moisture and, when in contact with the skin of the face, even drain the perspiration down over their surfaces whereby in the case of transparent shades, the vision is obscured. Moreover, in order to move them out of the way (for example when they are not required for some time) such goggles and the like must be lifted and pushed back. This causes the wearer trouble and loss of time, and, especially when engaged in welding work, is easily liable to soil the face.

The present invention obviates these defects, in that the actual eye shade, goggles, goggle mounts or the like, do not bear against the forehead. On the contrary, a free space is left, and the shade or the like can be brought out of and into position for use, by swinging it round its fixed terminal points without taking it off.

Preferably the two strips are connected together, pivotally, by means of an eyelet passing through the corresponding holes at one end of the strips, so that the shade can easily be raised and lowered by turning it round the pivotal eyelet.

The aforesaid front strip can be designed as a shade, for example as an eye shade when made of transparent or translucent material such as cellon, celluin, celluloid, glass or the like, and as a light excluding screen when made of opaque material. It may also serve merely as mount for discs or plates of transparent or translucent material, such as are required for the protection or optical examination of the eyes.

A typical embodiment of the invention, as applied to an eye shade, is illustrated in the accompanying drawing.

Fig. 1 is a front elevation of this embodiment;

Fig. 2 is a view from above;

Fig. 3 is a plan on a smaller scale showing the shade applied to the forehead; and Fig. 4 is a side elevation corresponding to Fig. 3.

The strip or shade member 1 of transparent material is provided, at each top corner, with a hole 2, 3 respectively for fixing it over the forehead 6 by means of a cord 4. Behind this shade, that is next the forehead, is a flexible strip 5 each end of which is also provided with a hole 7, 8 respectively. The distance between the holes 7 and 8 in the strip 5 is less than that between the holes 2 and 3 in the strip 1. The hole 7 in the strip 5 is connected to the hole 2 in the strip 1 by means of an eyelet 9, thus allowing the two strips to be relatively pivoted about said eyelet. The cord 4, of suitable length for the size of the head, is passed through the eyelet 9 on the one side, and through the holes 8, 3 (Fig. 1) provided in the other ends of the strips which holes, however, do not coincide when the shade is not in use. The cord is secured by knotting the ends. In consequence of the different spacing of the holes in the strip or shade member 1 and the flexible strip 5, a crescent shaped gap 10, for the passage of air, is formed when the shade is being worn (Fig. 3). The shade member 1 does not come into direct contact with the forehead 6, and therefore cannot be affected by perspiration.

The connection between the shade member 1 and the flexible strip 5 exists solely at the two ends, where the cord 4 passes through the holes. Between these points, the shade member stands away from the flexible strip, and can therefore be easily turned about the line or axis connecting the holes on the two sides of the shade when the flexible strip is secured in place. Thus, the shade member 1 can be swung upwards by a touch, when necessary, and held in the position assumed for the time being, by the friction of the cord against the rims of the holes, on the one hand, and, on the other, by the friction set up between the surfaces of the shade member and flexible strip by the pressure of the compressed rims of the eyelet.

I claim:—

An eye shade or the like, comprising a rear strip intended to bear against the forehead and having holes at its ends, a front strip having holes at its ends spaced farther apart than the holes in the rear strip, an eyelet inserted through the holes at one end of the strips and pivotally connecting them at that end, and a cord passed through said eyelet and through the holes at the other end of the strips and adapted to pass round the wearer's head, whereupon the front strip will be spaced from the rear strip between the ends and capable of being swung out of the field of vision when required.

In testimony whereof I affix my signature.

KARL GEORG NOWAK.